United States Patent [19]

Furuta et al.

[11] 4,367,500
[45] Jan. 4, 1983

[54] TAPE END DETECTION APPARATUS

[75] Inventors: Kenzi Furuta; Katsumi Kanayama, both of Hachioji, Japan

[73] Assignee: Olympus Optical Co., Ltd., Tokyo, Japan

[21] Appl. No.: 142,242

[22] Filed: Apr. 21, 1980

[30] Foreign Application Priority Data

May 2, 1979 [JP] Japan .................... 54-54598

[51] Int. Cl.³ .................... G11B 15/18; G11B 19/20
[52] U.S. Cl. .................... 360/74.2; 360/72.3
[58] Field of Search .................... 360/74.2, 72.2, 74.1, 360/74.4, 71, 137, 72.3; 179/100.1 PS, 100.1 TC

[56] References Cited

U.S. PATENT DOCUMENTS

| 3,622,229 | 11/1971 | John, Jr. | 360/74.4 |
| 3,940,672 | 2/1976 | Vogel | 360/74.4 |
| 4,032,712 | 6/1977 | Catto et al. | 360/71 |
| 4,155,104 | 5/1979 | Piltch | 360/71 |
| 4,157,575 | 6/1979 | Satoh et al. | 360/74.1 |
| 4,215,378 | 7/1980 | Sato et al. | 360/74.2 |
| 4,225,890 | 9/1980 | Takenaka et al. | 360/71 |
| 4,302,786 | 11/1981 | Takeuchi | 360/74.2 |

FOREIGN PATENT DOCUMENTS

1499944 6/1971 Fed. Rep. of Germany .

Primary Examiner—Alfred H. Eddleman
Attorney, Agent, or Firm—Frishauf, Holtz, Goodman & Woodward

[57] ABSTRACT

A tape end detection apparatus for a tape deck comprise a tape transport detection means which generates a first pulse in accordance with the transport of a tape. This apparatus further comprises a timer circuit means which does not operate to detect a terminal end of the tape during a period beginning from the start of a tape transport to the lapse of a first specified period of time, and which operates to detect, after the passage of the first specified period of time, the terminal end of the tape in accordance with the existence of the first pulse.

15 Claims, 5 Drawing Figures

TAPE END DETECTION APPARATUS

BACKGROUND OF THE INVENTION

This invention relates to a tape end detection apparatus which is used, for example, in a tape deck, to automatically stop or reverse the tape deck operation upon completion of the tape travel.

Usually, an electric tape-end detection apparatus detects the tape end in accordance with the presence or non-presence of a signal which is generated in response to the rotation of the tape reel. In this prior apparatus, there is provided a pulse generator which generates pulses responsive to the rotation of the supply reel or take-up reel and, when the pulse interval between the pulses from the pulse generator has exceeded a specified length of time, the power source of, for example, the deck is turned off. In this way, the automatic deck stopping operation based upon the detection of the tape end is performed after the lapse of a specified length of time from the stoppage of the reel rotation.

The automatic stopping operation time or auto-reverse time, i.e., the tape end detection time, preferably, is short. When, however, such tape end detection time is set at too short a time, some inconvenience will occur, for example, at a time when the tape is slackened. For instance, when the tape deck provided with the above-mentioned pulse generator on its take-up reel side is changed over to a rewind mode, even if tape remains to exist on the take-up reel side, the take-up reel is prevented from starting to rotate until said slackened portion of the tape is restored to the normal stretched or tensioned condition. Accordingly, if the period which is required for said tape slack to be corrected to permit the take-up reel to rotate to cause said pulse generator to generate a pulse is longer than said specified length of time, the deck operation automatically stops although a tape end is not reached. For these reasons, a limit is unavoidable for shortening the tape end detection time. The causes which prevent the shortening of such tape end detection time include said slackening of the tape, as well as a late rise in reel rotation speed due to based the inertia, etc. of a tape transport system.

Using typical numerical values, below is a discussion of how much time is required for the above-mentioned tape end detection. Let us consider a situation and case in which a pulse generator is provided on the take-up reel side, to generate one pulse per rotation of the reel and in which it is desired to detect the tape end by the pulse generator. In the case of a microcassette tape, the rotational period of the reel under the constant tape transport mode is approximately 7.5 sec. at maximum. This means that the above-mentioned length of time must be 7.5 seconds or more. When it is assumed from this that the time length is 7.5 seconds plus 0.5 sec. as an allowance, then said tape end detection time should be at least 8 seconds. This time length of 8 seconds is too long to be practical.

When, on the other hand, use is made of a pulse generator which generates, for example, 8 pulses per one rotation of the take-up reel, said tape end detection time becomes $(7.5/8)+0.5 \simeq 1.5$ seconds. This time length would raise no practical inconvenience. However, when the tape end detection time is shortened as such, if there occurs a delay in the start of the tape transport system due to the inertia of the capstan-flywheel or a slackening in the tape condition, such delay or slackening may cause an automatic stop of the tape transport at a tape position which is not the end. This means that the tape end detection apparatus makes an erroneous operation.

SUMMARY OF THE INVENTION

The object of this invention is to provide a tape end detection apparatus which provides a shortened tape end detection time and which does not suffer from erroneous operation.

For the purpose of achieving the above object, the tape end detection apparatus of the invention comprises a means to exclude, from the time period for detection of the tape end, the time required up to the correction of the tape slackening or the time corresponding to delay in the start of the tape transport system. Accordingly, after completion of the tape travel it is possible to perform the auto-stop/auto-reverse operation with a time lag which is short enough so as not to irritate the practical user.

DETAILED DESCRIPTION OF THE PREFERRED EMBODIMENT

To avoid redundant descriptions, common or similar portions are denoted by common or similar numerals throughout the drawings.

Figure 1:
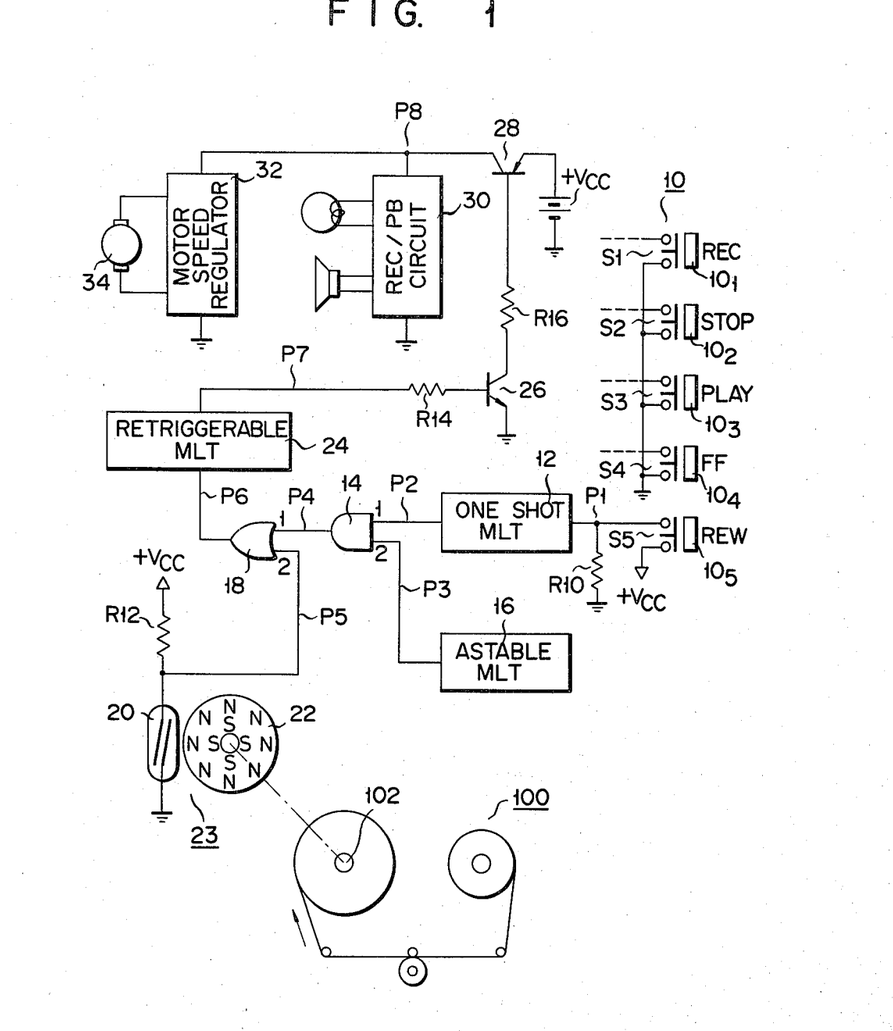
FIG. 1 is a circuit diagram showing the construction of a tape end detection apparatus according to an embodiment of the invention.

FIG. 1 shows the construction of an embodiment of the tape end detection apparatus according to the invention. Explanation will be made of a case where the tape terminal or tape end is detected from the rewinding operation. A switch S5 is attached to a rewinding button $10_5$ of an operation button section 10. One end of the switch S5 is connected to a power source $+V_{cc}$, while the other end thereof is grounded via a resistor R10. When the REW (rewind) button $10_5$ is actuated, a trigger pulse P1 having a logic level "1" is developed at said other end of the switch S5. This pulse P1 is applied to a one-shot multivibrator 12 serving as a first timer, which, upon being triggered, produces a gate signal P2 having a logic level "1" during only a first specified period T1. The first specified period T1 is determined in accordance with a time constant peculiar to the multivibrator 12. The gate signal P2 is applied to a first input terminal of an AND gate 14. To a second input terminal of the AND gate 14 is applied a second pulse P3 which has a period shorter than the first specified period T1. The pulse P3 is supplied from an astable multivibrator 16 serving as a pulse generator.

The AND gate 14 supplies a third pulse P4 to a first input terminal of an OR gate 18. The pulse P4 corresponds to the second signal P3 which has been passed through the AND gate 14 during a period in which the gate pulse P2 is the logic level "1". To a second input terminal of the OR gate 18 is applied a first pulse P5 which is generated in response to the travel of the tape. The pulse P5 is led out from a connection point between one end of a resistor R12 and one end of a lead switch 20. The other end of the resistor R12 is connected to the power source $+V_{cc}$, while the other end of the lead switch 20 is grounded. The lead switch 20 is turned on and off in accordance with a change in the magnetic field from a magnet ring 22. Namely, the lead switch 20 is turned on by the magnetic force of the magnet ring 22. The magnet ring 22 is interlocked with a take-up reel shaft 102 of a tape deck 100 and rotates following the rotation of the reel shaft 102 which follows the transport of the tape. The lead switch 20 and the magnet ring 22 constitute a tape transport detecting means 23.

The output of the OR gate 18, i.e., a logical OR pulse P6 is applied to a second timer circuit, i.e., retriggerable multivibrator 24. The second timer circuit is constituted by, for example, a time IC, Model NE555, of the U.S. Texas Instruments Inc. The detailed construction of the second timer circuit may be basically of a type which is similar to the type of a missing-pulse detector appearing as an applied example in the catalog of that corporation. Note here that what is important in this regard is not the specific circuit construction of the retriggerable multivibrator 24 but the function thereof. Namely, once the retriggerable multivibrator 24 has been triggered in response to the pulse P6, insofar as it is repetitively supplied with the pulse P6 in a cyclic period equal to or shorter than a second specified period T0, it is maintained in the triggered state. The second specified period T0 is determined in accordance with the time constant peculiar to the retriggerable multivibrator 24.

When triggered, the retriggerable multivibrator 24 generates a fourth pulse P7 having a logic level of "1", which pulse is applied to the base of an NPN transistor 26 via a resistor R14. The emitter of the transistor 26 is grounded, the collector of which is connected to the base of a PNP transistor 28 via a resistor R16. The power source $+V_{cc}$ is connected to the emitter of the PNP transistor 28. Power is supplied from the collector of the PNP transistor 28 to a recording/playback circuit 30 and a motor speed regulator 32 of the tape recorder. When the fourth pulse P7 is generated from the retriggerable multivibrator 24, the transistors 26 and 28 are turned on with a consequence that the recording/playback circuit 30 and the motor speed regulator 32 are rendered conductive by application thereto of a power supply signal P8. The motor speed regulator 32 for regulating the rotation of a motor 34 can be constituted by, for example, the motor speed regulator IC, model TCA 955, of Siemens Co. of West Germany.

Figure 2:
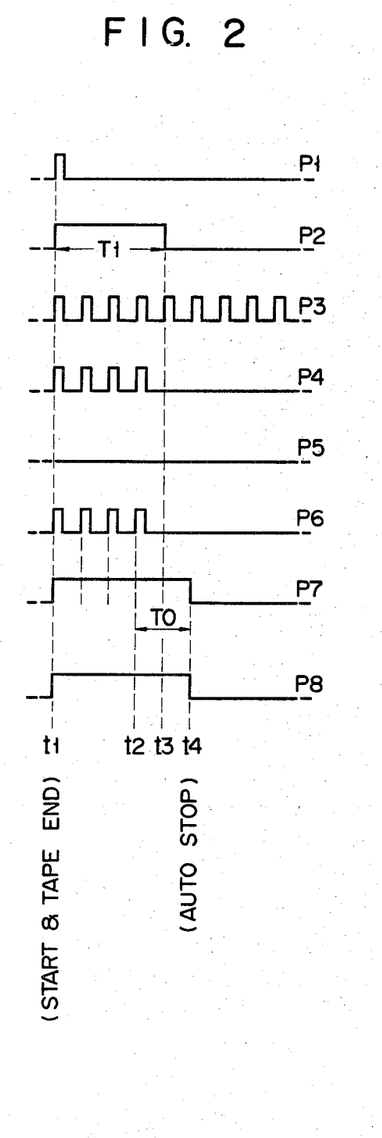
FIGS. 2 and 3 are timing charts for explaining the operation of the tape end detection apparatus shown in FIG. 1.

Reference will hereinafter be made to the operation of the tape end detection apparatus of FIG. 1 by reference to FIGS. 2 and 3. FIG. 2 illustrates a case where the rewind button $10_5$ is depressed under a situation in which the tape end is already reached. When at a time t1 the button $10_5$ is depressed, the switch S5 is turned on. Thus, the pulse P1 is generated. When triggered by the pulse P1, the one shot multivibrator 12 operates to supply the gate signal P2 having a pulse width of T1 to the AND gate 14. As the pulse P1 is generated, the astable multivibrator 16 starts to oscillate, so that the second pulse P3 is applied to the AND gate 14. This second pulse P3 can pass through the AND gate 14 during only the period in which the gate signal P2 has a logic level of "1". Namely, the third pulse P4 which has been generated four in number during a period t1 to t3 are inputted into the OR gate 18.

As above referred to, FIG. 2 shows the situation in which the tape end is already reached. That is, in FIG. 2, the rotation of the magnet ring 22 is kept stopped and the lead switch 20 is kept turned on. Accordingly, the first pulse P5 has a logic level of "0". Thus, the logical OR pulse P6 outputted from the OR gate 18 becomes the same in number as the third pulse P4 passed through the AND gate 14. When triggered by a rise of the initial pulse of the logical OR pulse P6, the retriggerable multivibrator 24 generates the fourth pulse P7 which is logical level "1". Then, the transistors 26 and 28 are turned on to permit the power supply signal P8 to cause a starting of power supply. Thus, the operation of the tape deck 100 is started.

After the generation at the time t2 of the final pulse P6, if no more pulse P6 is generated until the second specified period T0 elapses, the condition of the retriggerable multivibrator 24 in which it is triggered is allowed to pass away. Namely, after the lapse of the second specified period T0 from the time t2, the fourth pulse P7 is returned at a time t4 to a state of logical level "0". When the fourth pulse P7 becomes "0" in logical level, the transistors 26 and 28 are turned off with a consequence that the power supply signal P8 ceases to cause the power supply. This means that at the time t4 the automatic deck stopping operation based upon the tape end detection operation is completed.

The above-mentioned first specified period T1 is chosen to have a length which prevents the commencing of the automatic deck stopping operation due to a delay in the generation of the first pulse P5, which delay is attributable to a delay in the rise of the tape transport system, a reduction in the tension of the tape, etc. Assume now that 1.0 second at max. is required, after the tape deck 100 is changed over to the playback mode, up to the generation of the first pulse P5 by having the tape driven by means of the capstan and then having the reel shaft 102 rotated. Assume further that 1.0 second at max. is required for removing the slackening of the tape and generating the first pulse P5 after the tape deck 100 is changed over to the rewind mode when the tape is slackened. In this case, the first specified period T1 is chosen to be about 1.0 to 1.5 seconds. With regard to the second specified period T0, only if it is longer than a maximum cyclic period of the logical OR pulse P6, it will well serve the purpose. When it is now assumed that the cyclic periods of the third and first pulses P4 and P5 are 0.2 second and 0.4 second at max. respectively, then the second specified period T0 is chosen to be about 0.5 second.

To calculate the tape detection time on the above-mentioned assumptions, it is a value which falls within the range of T1+T0=1.5 to 2.0 seconds, at maximum. This tape detection time is represented, in FIG. 2, by the time interval between t1 and t4. What is noteworthy here is that during the time period t1 to t3 the retriggerable multivibrator 24 is triggered by the pulse P6, regardless of the rotation of the reel shaft 102. This means that that period of time (T1) is excluded from the time for detection of the tape end.

Figure 3:
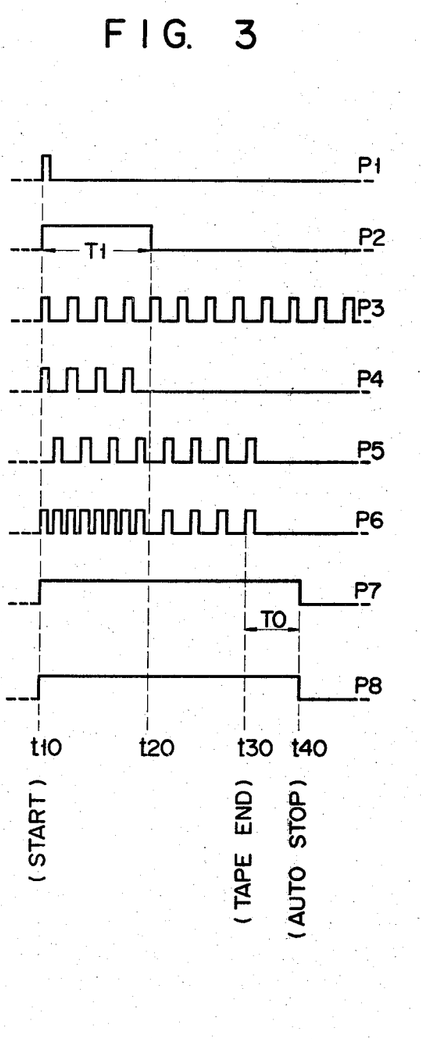

FIG. 3 shows the timing charts for explaining the operations starting with a state wherein the tape end is not reached and ending at the state wherein the tape end is reached. When at a time t10 the button $10_5$ is depressed, the pulse P1 is generated. Then the multivibrator 12 generates the gate signal P2 until a time T20, while the astable multivibrator 16 generates the second pulse P3. The pulse P3 which has a rise at the time t10 passes through the AND gate 14 and OR gate 18 and then triggers the retriggerable multivibrator 24 as a pulse P6. Thus, the transistors 26 and 28 are turned on, whereby the power supply signal P8 has a high level to cause a starting of the tape deck 100. Since at this time the tape end is not reached, the tape continues to transport and the magnet ring 22 is thereby caused to rotate. Then the first pulse P5 is inputted to the OR gate 18 in accordance with the rotation of the magnet ring 22. Thus, the logical OR pulse P6 outputted from the OR gate 18 becomes a pulse which is prepared by adding the third pulse P4 and the first pulse P5. When a time T20 is arrived at which falls upon the termination of the first specified period T1, the AND gate 14 is closed. Therefore, it is impossible for the third pulse P4 to be inputted into the OR gate 18. The magnet ring 22, however, starts to be rotated by the time when the time t20 is arrived at. By that time, therefore, the first pulse P5 is generated. After the time t20, the retriggerable multivibrator 24 continues to be triggered by the pulse P6 corresponding to the pulse P5. During the period in which the regriggerable multivibrator 24 is triggered, the fourth pulse P7 and power supply signal P8 remains at a high level, so that the tape transport continues.

When at a time t30 the tape terminal or tape end is reached, the rotation of the magnet ring 22 is stopped with a consequence that the first pulse P5 is extinguished. Since after the time t20 the third pulse P4 is also extinguished, the pulses P4 and P5 being inputted to the OR gate 18 are both extinguished. This means that at a time after the time t30 the logical OR pulse P6 is extinguished. Then, at a time t40 falling upon the termination of the second specified period T0 the triggered condition of the retriggerable multivibrator is passed away, whereby supply of power based upon the power supply signal P8 is completed. Namely, after the time that the tape end is reached, the period T0 elapses to the time t40, the automatic deck stopping operation based upon the tape end detecting operation is completed. When the second specified period T0 is chosen to be, for example, 0.5 second as mentioned above, the deck is automatically stopped after the lapse of only 0.5 second from the time at which the tape end is reached. This means that the tape detection time is equal to the second specified period T0.

As described above, according to the tape end detection apparatus of the invention, no detection is made of the tape end during the first specified period T1. This means that if the first specified period T1 is chosen to have a suitable length, the erroneous tape end detecting operation due to, for example, a slackening of the tape can be prevented. Further, according to the invention, the second specified period T0 is only required where it is desired to detect the tape end after the tape has travelled for a period longer than the first specified period T1. In this case, therefore, the tape deck can be automatically stopped within a very short time (T0) from the time at which the tape end is reached.

Figure 4:
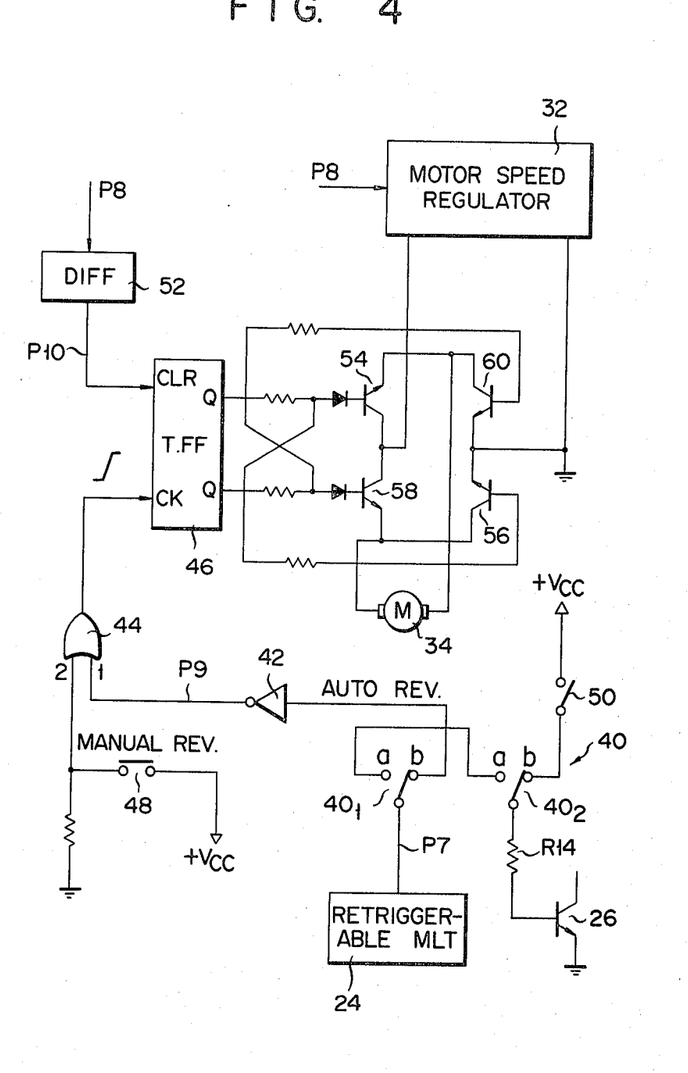
FIG. 4 is a circuit diagram showing a construction of the tape end detection apparatus wherein the construction of FIG. 1 is applied to the auto-reverse/auto-repeat tape end detecting operation.

FIG. 1 illustrates the automatic tape deck stopping operation which is to be performed from the rewind operation. The present invention is not limited thereto but is also applicable to other cases. One of these cases is illustrated in FIG. 4. That is the case wherein the trigger pulse P1 is generated by actuating a play button 10₃ of the operation button section 10. The illustration of FIG. 4 is the same as that of FIG. 1 until the stage is reached wherein the first pulse P7 is outputted from the retriggerable multivibrator 24.

The pulse P7 is inputted to a first circuit switch $40_1$ of a two-gang and two-contact switch 40 for change-over of the auto-stop/auto-reverse operation. When the first circuit switch $40_1$ and second circuit switch $40_2$ which constitute the two-gang and two-contact switch 40 are selectively changed over to the contacts a respectively, the pulse P7 is applied to the base of the transistor 26 via the switch $40_1$, switch $40_2$ and resistor R14. In this case, the FIG. 4 operation enters the same auto-stop mode as in FIG. 1. When on the other hand the switches $40_1$ and $40_2$ of the two-gang and two-contact switch 40 are changed over to the contacts b respectively, then the transistor 26 is biased by the power source $+V_{cc}$ via a switch 50 and is thus turned on, whereby the pulse P7 is inputted to an inverter 42. The inverter 42 produces a fifth pulse P9 which has been inverted by it from the pulse P7.

The pulse P9 is supplied to the clock input terminal CK of a toggle flip-flop or T type flip-flop (T·FF) 46 via a first input terminal of an OR gate 44. The T·FF 46 is clocked by a logical level change of "0" to "1" of the pulse at the clock input terminal CK and, each time it is clocked, inverts the signal level at its output terminal Q and at its output terminal $\overline{Q}$. For instance, when at the time t40 of FIG. 3 the logical level of the pulse P7 is changed from "1" to "0", the pulse P9 is changed from "0" to "1", whereby the T·FF 46 is clocked. The T·FF 46 can also be clocked by turning on a manual switch 48 connected to a second input terminal of the OR gate 44.

When the switch 50 is turned on and the transistors 26 and 28 of FIG. 1 are turned on respectively, the signal P8 is generated to render the circuit 30 and the speed regulator 32 conductive respectively. Further, the switch 50 is turned on in interlocking relation with the actuation of the playback button $10_3$ and turned off in interlocking relation with the actuation of the stop button $10_2$. The rising portion of the signal P8 at the moment of its generation becomes a clear pulse P10, after passing through a differentiation circuit 52, which has a narrow pulse width. The pulse P10 clears the T·FF 46. Then, the T·FF 46 produces an output pulse of "1" from the output terminal Q and an output pulse of "0" from the output terminal $\overline{Q}$. Thus, NPN transistors 54 and 56 are turned on while NPN transistors 58 and 60 are turned off. In this case, the motor 34 makes a normal rotation to cause the tape to transport in the forward direction. When the time t40 in FIG. 3 is arrived at, the T·FF 46 is clocked in response to the inversion of the level of the pulse P7. Then, the output terminal Q of the T·FF 46 has an output pulse having a logical level of "0" while the output terminal $\overline{Q}$ has an output pulse having a logical level of "1". Thus, the transistors 58 and 60 are respectively turned on, whereby the motor 34 makes a reverse rotation. When the reverse transport of the tape is started in accordance with the reverse rotation of the motor 34, the pulse P5 (FIG. 1) is again generated to cause the retriggerable multivibrator 24 to be triggered. Then, the tape end detection apparatus is returned to the mode corresponding to the time t10 in FIG. 3, whereby reverse playback is effected. As stated above, when at the time t10 the pulse P7 is changed from "0" to "1", the prior pulse level "1" of the clock input terminal CK of the T·FF 46 is changed at the time t10 to "0". At this time, therefore, the T·FF 46 is not clocked. When the level change corresponding to the time t40 occurs again in the pulse P7, the reverse playback mode is automatically changed over to the forward playback mode.

Figure 5:
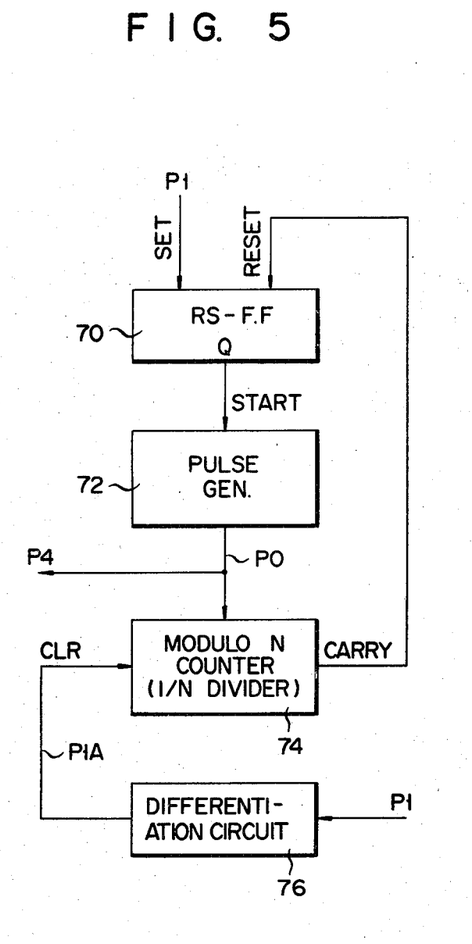
FIG. 5 is a block diagram showing a partially modified example of the construction shown in FIG. 1.

Although specific constructions have been illustrated and described herein, it is not intended that the invention be limited to the elements and constructions disclosed. One skilled in the art will recognize that other particular elements or subconstructions may be used without departing from the scope and spirit of the invention. For example, use can be made, as the tape deck, of a deck for use in a microcassette tape recorder as well as in a Philips type cassette tape recorder or an open reel type tape recorder. Further, use can be made, as the tape transport detection means, of a photo-interrupter whose optical path is rendered effective or ineffective in accordance with the rotation of the reel shaft 102, as well as of a combination of the lead switch 20 with the magnet ring 22. Furthermore, an electrically interlocked combination of the first timer circuit 12, pulse generator circuit 16 and gate circuit 14 can be replaced by, for example, the following construction. As shown in FIG. 5, said replacement can be made by using a RS flip-flop 70 being set by the trigger pulse P1, a pulse generator 72 generating a pulse P0 having a specified cyclic period when the RS flip-flop 70 has been set, and a modulo N counter 74 (1/N divider) for dividing by N the frequency of the output pulse P0 of the pulse generator 72. When the flip-flop 70 is set to cause the pulse generator 72 to generate an N number of pulses, the divide-by-N frequency counter 74 produces a carry-out signal for resetting the flip-flop 70. Namely, when N numbers of pulses are produced from the pulse generator 72, then this generator 72 is caused by said carry-out signal to stop generating an output pulse any further. The period required from the setting of the flip-flop to the resetting thereof corresponds to the above-mentioned first specified period T1. During that period, said N numbers of pulses P0 are utilized as the third pulse P4. Note in this connection that the counter 74, upon generation of the pulse P1, is cleared by the rising edge thereof. The clear pulse P1A for this clearance is obtained by differentiating the pulse P1 by a differentiation circuit 76.

What we claim is:

1. A tape end detection apparatus comprising:
   a tape transport means for transporting tape;
   a tape transport detection means coupled to said tape transport means for generating a first pulse in response to the tape transport by the tape transport means; and
   a timer circuit means coupled to said tape transport means which includes means for preventing detection of a terminal end of said tape during a period beginning from the start of a tape transport to the lapse of a first specified period of time, and for enabling detection of a terminal end of said tape, after the passage of said first specified period of time, in accordance with the existence of said first pulse, said timer circuit means including:
   a first timer circuit which is triggered at the time of the commencement of said tape transport to generate a gate signal only during said first specified period of time,
   a pulse generating circuit which generates a second pulse having a cyclic period shorter than said first specified period of time,
   a gate circuit coupled to said pulse generating circuit and allowing said second pulse to pass therethrough as a third pulse only during a period of time during which said gate signal is generated,
   logical OR circuit means coupled to receive said first and third pulses and for generating a logical OR signal responsive thereto, and
   a second timer circuit coupled to said logical OR circuit means and which is triggered by said logical OR signal of said first pulse and said third pulse and which is kept triggered while the cyclic period of the pulse of said logical OR signal falls within a second specified period of time,
   whereby the terminal end of said tape, at the time when after the lapse of said first specified period of time the trigger of said second timer circuit has passed away, is detected in accordance with the extinguishment of the trigger of said second timer circuit.

2. A tape end detection apparatus comprising:
   a tape transport means for transporting tape;
   a tape transport detection means coupled to said tape transport means for generating a first pulse in response to the tape transport by the tape transport means; and
   a timer circuit means coupled to said tape transport means which includes means for preventing detection of a terminal end of said tape during a period beginning from the start of a tape transport to the lapse of a first specified period of time, and for enabling detection of a terminal end of said tape, after the passage of said first specified period of time, in accordance with the existence of said first pulse, said timer circuit means including:
   a flip-flop which is set at the time of the commencement of said tape transport,
   a pulse generating circuit coupled to said flip-flop for generating a second pulse having a cyclic period shorter than said first specified period at the time when said flip-flop has been set,
   an N scale counter coupled to said pulse generating circuit for dividing the frequency of said second pulse, and for resetting said flip-flop at the time when said frequency dividing operation corresponds to a specified value,
   logical OR circuit means coupled to receive said first and second pulses and for generating a logical OR signal responsive thereto, and
   a first timer circuit coupled to said logical OR circuit means and which is triggered by said logical OR signal of said first pulse and said second pulse and which is kept triggered while the cyclic period of the pulse of said logical OR signal falls within a second specified period of time, whereby the terminal end of said tape, at the time when after the lapse of said first specified period of time the trigger of said first timer circuit has passed away, is detected in accordance with the extinguishment of the trigger of said first timer circuit.

3. The tape end detection apparatus of claim 1 or 2, further comprising means for generating a further pulse responsive to detection that the terminal end of said tape is reached, said further pulse being coupled to said tape transport means for causing a stop of the tape transport at said tape transport means responsive to said further pulse, said further pulse being generated after the triggering period of said timer circuit which is coupled to said logical OR circuit means becomes longer than said second specified period of time.

4. The tape end detection apparatus of claim 1 or 2, further comprising means for generating a further pulse responsive to detection that the terminal end of said tape has been reached, said further pulse being coupled to said tape transport means for causing reversing of the direction of the tape transport at the tape transport means responsive to said further pulse and after the tape has been stopped, said tape transport being stopped after the triggering period of said timer circuit which is coupled to said logical OR circuit means becomes longer than said second specified period of time.

5. The tape end detection apparatus of claim 1 or 2, wherein said first specified period of time is sufficiently long to permit preventing of an automatic stopping of the tape transport due to a delay in the generation of said first pulse during operation of said tape transport means.

6. A tape end detecting apparatus comprising:
tape transport means;
tape transporting detecting means responsive to tape transporting on said tape transport means for generating a first trigger pulse;
tape end detecting means coupled to said tape transporting detecting means for judging whether a tape end has been reached based on the absence or presence of said first trigger pulse, said tape end detection means being further coupled to said tape transport means for stopping tape transporting when tape end detecting means judges that a tape end has been reached; and
inhibiting means including timer means having a given timer period, said inhibiting means being coupled to said tape end detection means for inhibiting the operation of said tape end detecting means during a given timer period beginning from the start of the tape transporting to the lapse of a specified time period to thereby prevent judging the presence of the tape end during said given timer period.

7. A tape end detecting apparatus comprising:
tape transport means for transporting a tape with a given mode of tape transporting;
tape transporting detecting means coupled to said tape transport means for generating a first trigger pulse in response to the transporting of tape;
timer means coupled to said tape transport means for generating an extra pulse during a time period beginning from the start of said given mode of tape transporting to the lapse of a first specified time period;
means coupled to said timer means and to said tape transporting detecting means for generating a second trigger pulse which contains both said extra pulse and said first trigger pulse; and
end of tape detection means responsive to said second trigger pulse for generating a drive pulse which is coupled to said tape transport means for actuating said tape transport means, said end of tape detection means continuing the generation of said drive pulse while the cyclic period of said second trigger pulse falls within a second specified time period, and said end of tape detection means stopping the generation of said drive pulse when the cyclic period of said second trigger pulse exceeds said second specified time period.

8. A tape end detecting apparatus comprising:
tape transport means for transporting a tape with a given mode of tape transporting;
operation means coupled to said transporting means for setting said given mode of tape transporting and for generating a first trigger pulse representing the start of said given mode of tape transporting;
tape transporting detection means coupled to said tape transport means for generating a first pulse in response to the transporting of tape;
timer means coupled to said operation means and being responsive to said first trigger pulse for generating an extra pulse during a time period beginning from the start of generation of said trigger pulse to the lapse of a first specified time period;
means coupled to said timer means and to said tape transporting detecting means for generating a second trigger pulse which contains both said extra pulse and said first pulse; and
end of tape detection means responsive to said second trigger pulse for generating a drive pulse which is coupled to said tape transport means for actuating said tape transport means, said end of tape detection means continuing the generation of said drive pulse while the cyclic period of said second trigger pulse falls within a second specified time period and said end of tape detection means stopping the generation of said drive pulse when the cyclic period of said second trigger pulse exceeds said second specified time period.

9. The tape end detecting apparatus of claim 8, wherein said timer means includes:
a first timer circuit triggered by said first trigger pulse for generating a gate signal during said first specified time period;
a pulse generating circuit for generating a second pulse having a cyclic period shorter than said first specified time period; and
a gate circuit coupled to said generating means, to said first timer circuit and to said pulse generating circuit, for generating said extra pulse which represents the logical AND of said extra pulse and said gate signal.

10. The tape end detecting apparatus of claim 8, wherein said timer means includes:
a pulse generator circuit responsive to said first trigger pulse for generating a count pulse after being triggered by said first trigger pulse; and
a counter circuit coupled to said pulse generator circuit and being responsive to said first trigger pulse for counting said count pulse and for providing a carry out signal when the count thereof corresponds to a given value, and carry out signal being coupled to said pulse generator circuit, said counter circuit being initialized by said first trigger pulse, and the generating of said count pulse being stopped when said carry out signal is provided to said pulse generator circuit.

11. The end of tape detecting apparatus of any one of claims 7, 8, 9 or 10, wherein said tape transport means includes control means responsive to said drive pulse for start/stop controlling the actuation of said tape transporting, said control means stopping said tape transporting actuation when said drive pulse disappears.

12. The end of tape detecting apparatus of any one of claims 7, 8, 9 or 10, wherein said tape transporting means includes reversing means responsive to said drive pulse for reversing the direction of said tape transporting, said reversing means reversing said tape transporting direction when the logical level of said drive pulse changes.

13. The end of tape detecting apparatus of any one of claims 7, 8, 9 or 10, wherein said first specified time period has a length which permits preventing of an automatic stopping of the tape transport means due to a delay in the generation of said first pulse.

14. The end of tape detecting apparatus of any one of claims 7, 8, 9 or 10, wherein said end of tape detection means includes means for judging whether a tape end has been reached based on the absence or presence of said first pulse.

15. The tape end detecting apparatus of claim 9 or 10, wherein said end of tape detection means includes a second timer circuit triggered by said second trigger pulse for generating said drive pulse, said second timer circuit continuing the generation of said drive pulse while the cyclic period of said second trigger pulse falls within a second specified time period, and said second timer circuit stopping the generating of said drive pulse when the cyclic period of said second trigger pulse exceeds said second specified time period.

* * * * *